United States Patent [19]
Chiba et al.

[11] Patent Number: 5,012,361
[45] Date of Patent: Apr. 30, 1991

[54] DATA SIGNAL REPRODUCING APPARATUS FOR HELICAL SCAN RECORDING

[75] Inventors: Nobuhiro Chiba; Yoshihiro Murakami, both of Kanagawa, Japan

[73] Assignee: Sony Corporation, Tokyo, Japan

[21] Appl. No.: 334,556

[22] Filed: Apr. 7, 1989

[30] Foreign Application Priority Data

Apr. 8, 1988 [JP] Japan .................................. 63-86675

[51] Int. Cl.⁵ .............................................. H04N 5/78
[52] U.S. Cl. .................................................. 360/38.1
[58] Field of Search ........................ 360/38.1, 36.2, 32; 371/39, 40, 44, 45

[56] References Cited

U.S. PATENT DOCUMENTS 4,742,519 5/1988 Abe et al. ........................... 360/38.1
4,882,732 11/1989 Kaminaga .......................... 360/38.1

Primary Examiner—Vincent P. Canney
Attorney, Agent, or Firm—Alvin Sinderbrand; William S. Frommer

[57] ABSTRACT

In an apparatus, such as a digital video tape recorder, for reproducing data signals recorded on helical scan recording tracks each having a plurality of sectors, with two adjacent tracks forming a segment and three segments forming a field, changes of sector and segment identical data are detected during reproduction, and an error signal is generated when a change in a segment occurs without a change in a sector. Either an error correction circuit or a concealing circuit receives the error signal, and is activated to perform error correction or error concealment. As a result, high quality reproduction is achieved, even in a shuttle reproduction mode.

5 Claims, 6 Drawing Sheets

DATA SIGNAL REPRODUCING APPARATUS FOR HELICAL SCAN RECORDING

BACKGROUND OF THE INVENTION

1. Field of the Invention

This invention relates to apparatus for reproducing a helical scan recording by a rotary head. More particularly, this invention relates to such an apparatus for reproducing data signals recorded on plural sectors within plural segments of a single field.

2. Description of the Prior Art

In a helical scan type digital video tape recorder for recording and reproducing NTSC composite signals, a SMPTE D-2 format is employed in which each field is divided into three segments and each segment is recorded on two helical tracks. FIG. 1 shows the D-2 format on a magnetic tape (TP). In this D-2 format, the data of one segment are recorded on two, tracks with each track ($T_N$) having an azimuth angle different from that of the adjacent tracks. Video data are recorded at the center of each track ($T_N$). Audio data are recorded at both ends of each track ($T_N$). The 4-channel audio data ($A_0$), ($A_1$), ($A_2$) and ($A_3$) are recorded respectively in the four sectors ($SC_0$), ($SC_1$), ($SC_2$) and ($SC_3$), sectors ($SC_0$) and ($SC_1$) are provided at one end of each track ($T_N$), while sectors ($SC_2$) and ($SC_3$) are provided at the other end of each track. The audio data are recorded in duplicate on the sectors at opposite ends of two adjacent tracks. For example, a track ($T_0$) and a track ($T_1$) have the same audio data. Referring to FIG. 2, a sector format typical of each sector is shown in which the audio data is formed by six blocks. Each block is composed of a sync (SYNC) pattern, an ID pattern and inner code blocks composed of digital audio data and the check bytes. The ID pattern includes the segment ($S_n$) and sector sequence information. In order to reproduce the data of D-2format, a rotary magnetic head device (100) is employed. As shown on FIG. 3, the rotary magnetic head device (100) has two pairs of heads ($H_A$) and ($H_B$), and ($H_C$) and ($H_D$) mounted so that each head of a pair is close to adjacent tracks on the tape (TP). Each of heads ($H_A$), ($H_B$), ($H_C$) and ($H_D$) is arranged on 180° opposite on a cylindrical rotary drum (DR) in 180° opposition to another of the heads, thereby enabling a pair of heads always to abut the tape (TP).

When shuttle reproduction is performed on such D-2 format, the running speed of the tape (TP) is increased. As shown in FIG. 4, a locus of the head then crosses a plurality of tracks ($T_N$). Data of the shuttle reproduction mode are corrected to minimize the deterioration in the playback image by using the present digital technique.

In a digital video tape recorder adapted for reproducing the data recorded in the above described D-2 format, data of different tracks are mixed at the time of shuttle reproduction and audio data are reproduced in a state devoid of continuity. Since the data of the different tracks differ in the correction code blocks and hence cannot be corrected, the amount forming the data of audio signals is diminished drastically at the time of shuttle reproduction. As a result, the audio signals cannot be reproduced satisfactorily.

SUMMARY OF THE INVENTION

It is an object of the present invention to provide a data signal reproducing apparatus for a helical scan recording system, in which the recording format is formed by plural sectors within plural segments of a single field, and wherein audio data can be reproduced satisfactorily even at the time of shuttle reproduction.

Briefly, the present invention provides a data signal reproducing apparatus wherein sector data and segment data are reproduced and their changes are detected. When the segment data change is detected without the sector data being changed, an error detection means outputs error flag data. In the cases where only the sector data change or both the sector and segment data change, the error flag data are not produced. A data correction circuit or a concealing circuit is activated by the error flag data to reproduce audio data satisfactorily. The aforementioned D-2 format, audio data are recorded twice for forming first and second copies. A copy selector selects the less erroneous copy to perform efficient error concealment.

DESCRIPTION OF THE PREFERRED EMBODIMENT

In the particular embodiment to be described, the invention is applied to a D-2 format digital video tape recorder previously explained with reference to FIGS. 1 to 4. As mentioned above, one field is divided into three segments of data, and each segment's data are recorded on a pair of helical tracks by the rotary magnetic head device. Each track has four sectors on which audio data are recorded. The pair of tracks include the same audio data.

Figure 6:
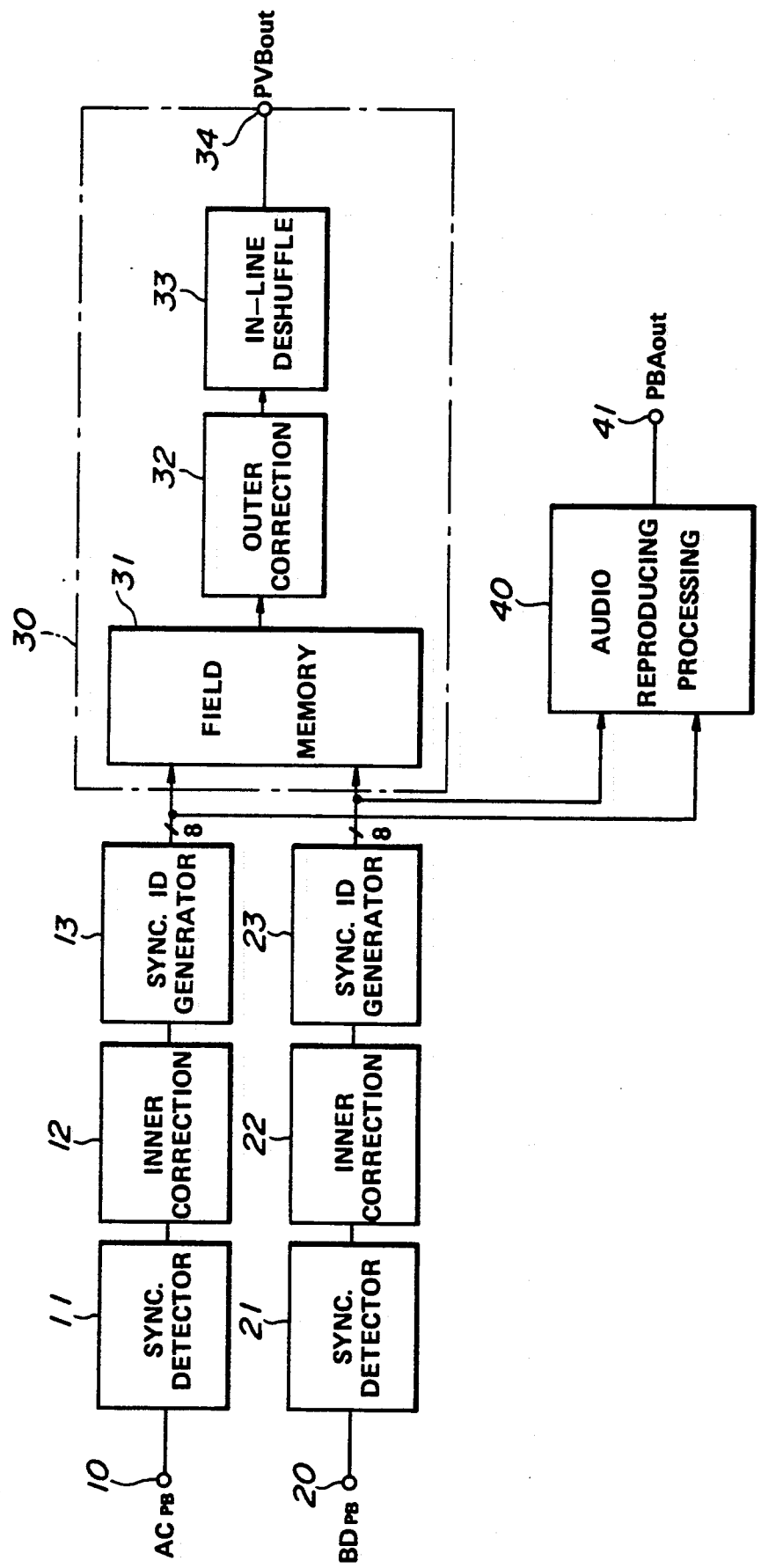
FIG. 6 is a block diagram showing the construction of the reproducing system embodying the invention.

Referring now to FIG. 6, a reproducing system of the digital video tape recorder according 98 to an embodiment of the invention is shown to receive RF signals ($AC_{PB}$), ($BD_{PB}$) reproduced by the heads ($H_A$), ($H_C$), ($H_B$), ($H_D$) of the rotary magnetic head device (100) from the magnetic tape (TP) . The reproduced RF signals ($AC_{PB}$), ($BD_{PB}$) are supplied to the 2-channel signal input terminals (10), (20).

Each of the reproducing RF signals ($AC_{PB}$ and $BD_{PB}$) is supplied to the video reproducing processing block (30) and the audio reproducing processing block (40) from the 2-channel signal input terminals (10), (20) via respective sync detection circuits (11), (21), inner code correction circuits (12), (22) and SYNC ID generating circuits (13), (23).

The inner code correction circuits (12), (22) correct the data of the inner code block by using the inner check code the reproduced data for each channel. This inner data correction corresponds to SYNC signals separated from the reproducing RF signals (AC$_{PB}$) and (BD$_{PB}$) for each channel by the sync detection circuit (11), (21). Each of the SYNC ID generating circuits (13), (23) detects the sync (SYNC) pattern or the ID pattern with respect to the reproduced RF signals (AC$_{PB}$) and (B$_{PB}$) of each channel as already corrected by the inner code correction circuits (12), (22) and then generates sync and ID information.

The video reproduction processing block (30) comprises a field memory (31), an outer code correction circuit (32) and a de-shuffle processing circuit (33). The field memory (31) stores the reproduced video data which have been corrected in the inner code correction circuit (12) (22). In addition time base correction and rearrangement of the reproduced video data of each channel are performed in the field memory (31). The outer code correction circuit (32) corrects the reproduced video data using an outer code, then the de-shuffle circuit (33) rearranges the data. The rearranged video data (PBV$_{OUT}$) form an original array and are output at the signal output terminal (34).

The audio reproduction processing block (40) receives the corrected data produced by the inner code correction circuits (12), (22), and serves as a time base corrector, a time base extending circuit, an outer code correction circuit, a concealing circuit, and a data de-shuffle block. An original array audio data (PBA$_{OUT}$) is formed and output at the signal output terminal (41).

Figures 1, 2:
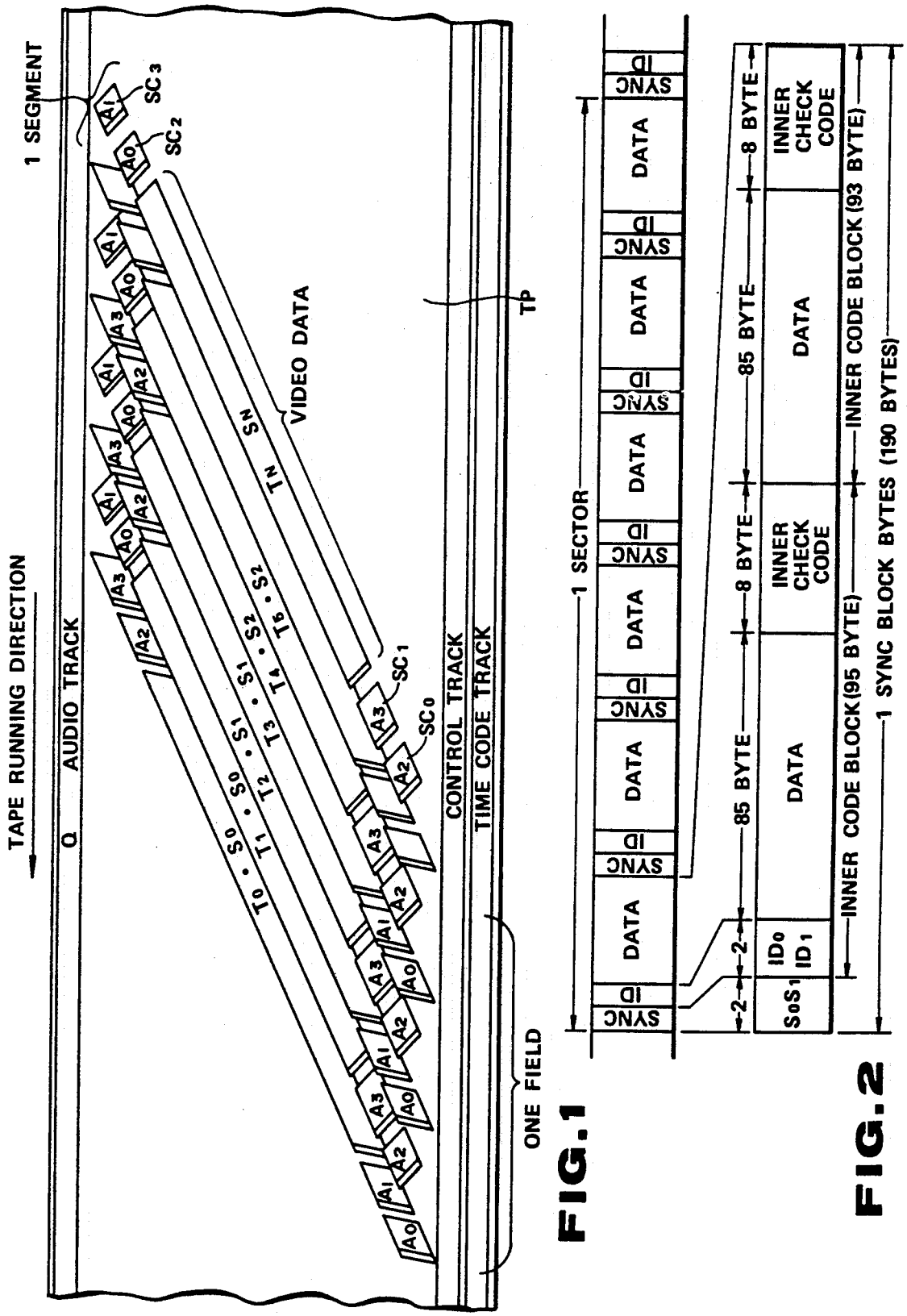
FIG. 1 is a diagrammatic view showing the recording pattern of the D-2 format digital video tape recorder to which the present invention is applied.
FIG. 2 is a diagrammatic view showing the data structure of a single sector in the D-2 format.
Figure 3:
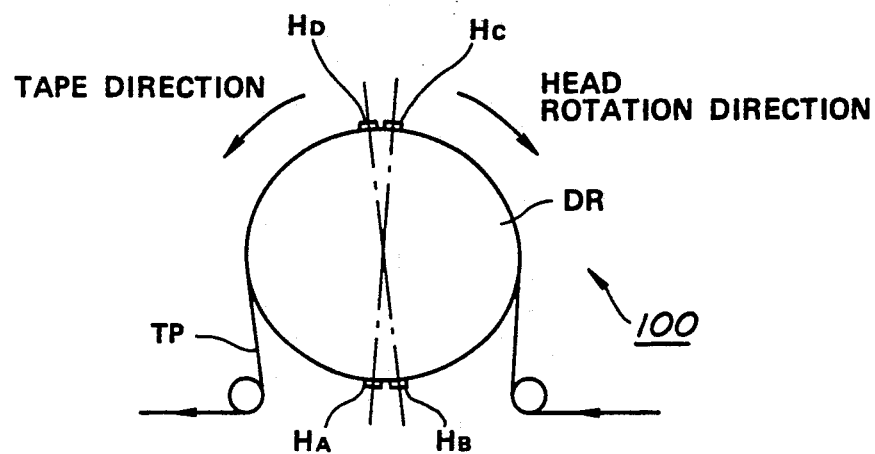
FIG. 3 is a diagrammatic view showing the D-2 format scanner or head drum construction.
Figure 4:
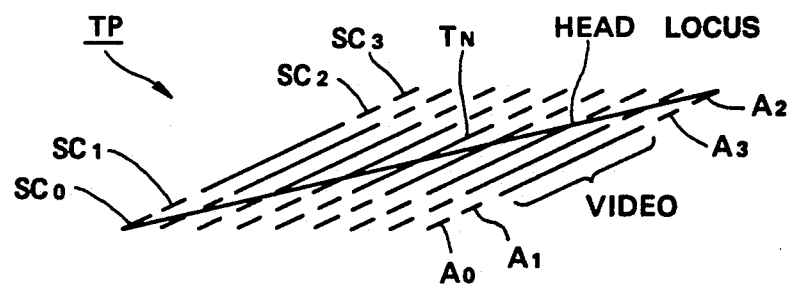
FIG. 4 is a diagrammatic view showing the head locus at the time of shuttle reproduction.
Figure 5:
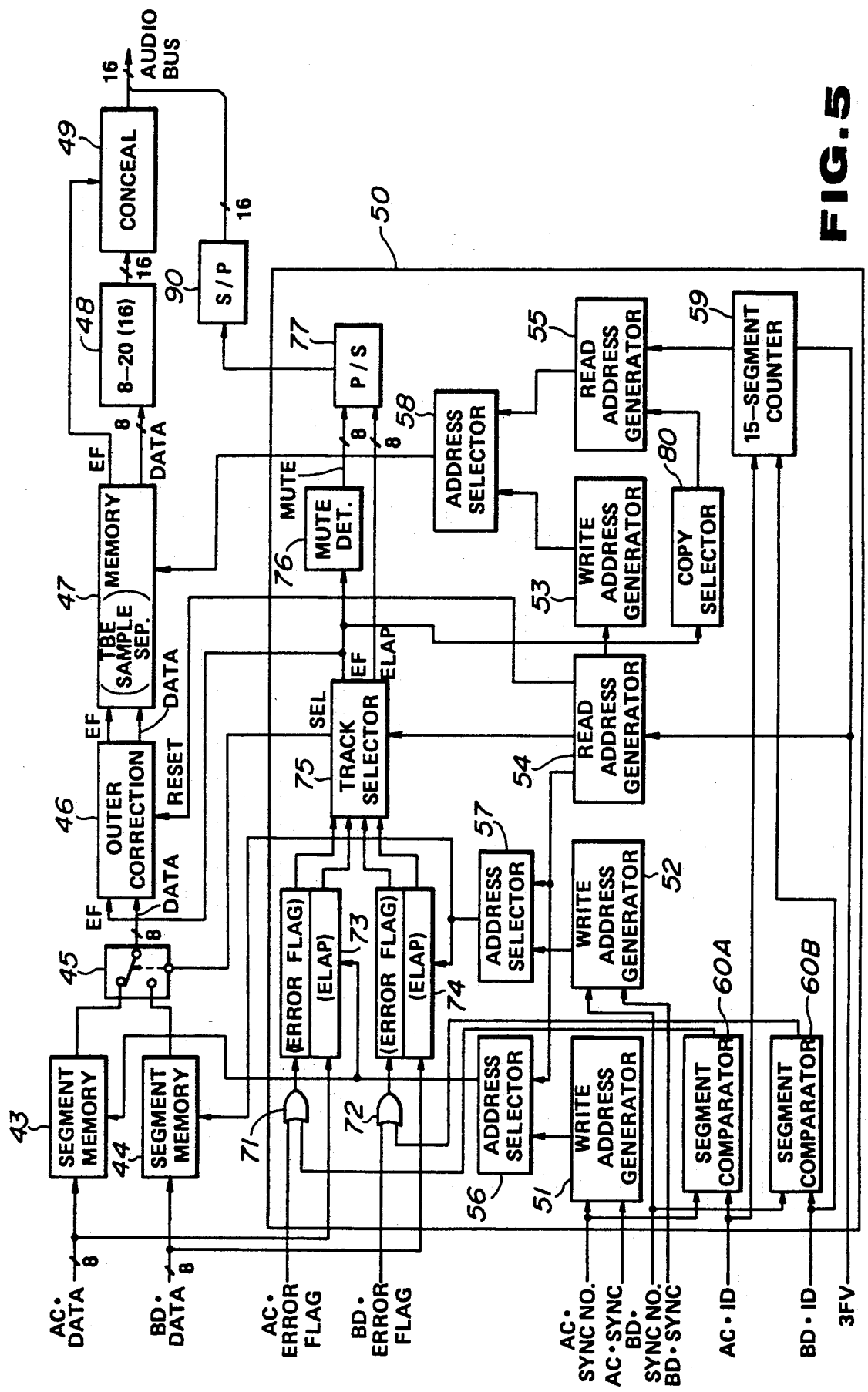
FIG. 5 is a block diagram showing a reproduced audio processing circuit included in a reproducing system according to an embodiment of this invention applied to a digital video tape recorder of the D-2 format.

FIG. 5 shows a circuit arrengement of the audio reproduction processing block (40) of FIG. 4. The audio reproducing block (40) includes two segment memories (43), (44) each having a capacity for storing one-segment of data. An outer code correction circuit (46) receives the reproducing audio data (AC DATA), (BD DATA) of each channel from the segment memories (43), (44) via switching circuit (45). A memory circuit (47) processes the corrected reproduced audio data received from the outer code correction circuit (46) performing time axis extension or data selection processing. An 8-16 conversion processing circuit (48) performs a demodulating operation converting the reproduced audio data read out from the memory circuit (47). A concealing circuit (49) performs error correction of the demodulated reproduced audio data generated by said 8-16 conversion processing circuit (48). A control block (50) controls the operations of the various circuit blocks.

The control block (50) includes a first write address generator (51) for forming write addresses that are synchronized with the sync information (AC SYNC) of the reproduced audio data (AC DATA) of one channel as generated by said SYNC generator (13). A second write address generator (52) forms write addresses synchronized with sync information (BD SYNC) of the reproduced audio data (BD DATA) of the other channel as generated by said SYNC ID generator (23). A third write address generator (53) forms write addresses synchronized with reference sync information (3FV). First and second read address generators (54), (55) from read addresses synchronized with said reference sync information (3FV). The write address formed by the first write address generator (51) and the read address formed by the first read address generator (54) are changed over by a first address selector (56) and supplied to the one segment memory (43). The write address by the second write address generator (52) and the read address by the first read address generator (54) are changed over by the second address selector (57) and supplied to the other segment memory (44). The write address formed by the third write address generator (53) and the read address formed by the second read address generator (55) are changed over by the third selector (58) and supplied to the memory circuit (47).

It is to be noted that the read address generator (55) is synchronized with the reference sync information (3FV) by a 15-segment counter (59) counting the ID information (AC ID), (BD ID) of each channel. As previously discussed the ID information is generated by the SYNC ID generators (13), (23).

The control block (50) also includes first and second segment comparators (60A), (60B) for detecting that the segment data have changed without the sector data being changed. The ID information (AC ID), (BD ID) of each channel generated by the SYNC ID generators (13), (23) is used memories (73), (74) store the edit flag data (AC ELAP), (BD ELAP) and error flag data (AC ER FLAG), (BD ER FLAG) of the playback audio data (AC DATA) of each channel corrected at each inner code correction circuits (12), (22). The output of each of the segment comparators (60A), (60B) are supplied to the memories (73), (74) through OR gates (71), (72), along with the error flag data (AC ER FLAG), (BD ER FLAG) which are supplied as the error detection signals.

The error flag data (AC ER FLAG), (BD ER FLAG) and edit flag data (AC ELAP), (BD ELAP) are read out from the memories (73), (74) and supplied to a track selector (75). The error flag data (EF) are supplied from this track selector (75) to a copy selector (80) and to the other code correction circuit (46) as well as to a parallel serial converter (77). The edit flag data (ELAP) also are supplied to the parallel serial converter (77) through mute detecting circuits (76).

The edit flag data (ELAP) and the error flag data (EF) converted at the parallel serial converter (77) into the serial data are again restored to the parallel data at the serial parallel converter (90) and again outputted along with the reproducing audio data (PB$_{OUT}$).

Figure 7:
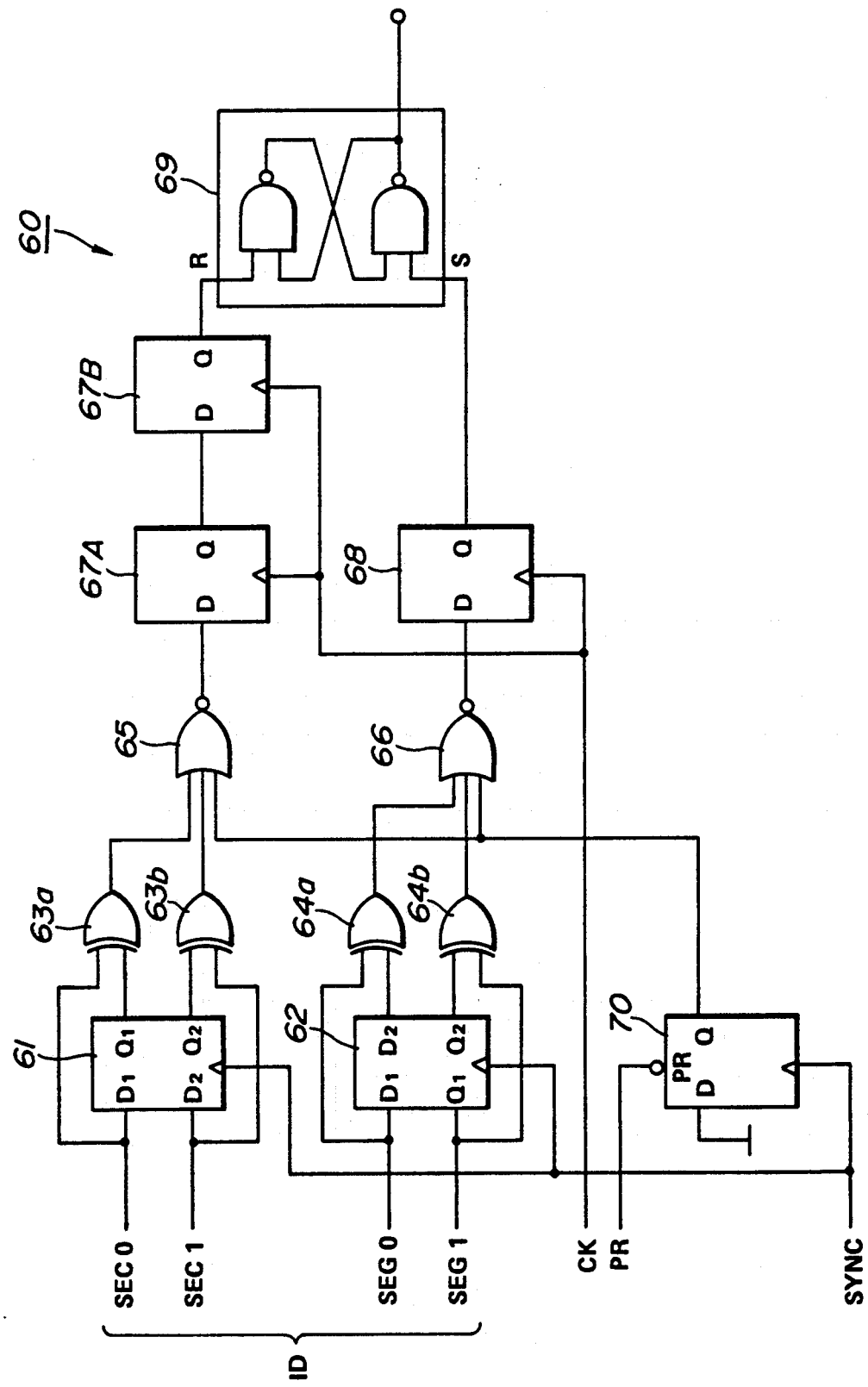
FIG. 7 is a circuit diagram showing a structural example of a segment comparator included in the illustrated embodiment.

The segment comparators (60A), (60B) are constructed as shown in the circuit diagram shown in FIG. 7.

Thus, each segment comparator (60) is shown to include D-type flip flops (61), (62) for latching in response to sync information (SYNC) the segment data (SEG 0), (SEG 1) and sector data (SEC 0), (SEC 1), together supplied as the ID information in the reproducing data. EX (exclusive) OR gate circuits (63a), (63b), (64a), (64b) perform an exclusive OR of the data input (D$_1$), (D$_2$) to the D-type flipflops (61), (62) and the latch outputs (Q$_1$), (Q$_2$). NOR gate circuits (65), (66) receive outputs of the EX OR gate circuits (63a), (63b), (64a), (64b) and provide an output to a RS flipflop circuit (69) via D-type flipflops (67A), (67B), (68).

The EX OR gate circuits (63a), (63b), (64a) (64b) provide a logical "H" output when the segment data (SEG 0), (SEG 1) or sector data (SEC 0), (SEC 1) supplied from the sync information (SYNC) are changed. The output resets the RS flipflops circuit (69) each time the sector information (SEC 0), (SEC 1) are changed, and sets the RS flipflop circuit (69) each time the segment information (SEG 0), (SEG 1) are changed.

Thus, the RS flipflop circuit (69) provides an output indicating that the segment data (SEG 0), (SEG 1) have been changed without the sector data (SEC 0), (SEC 1) supplied as the ID information in the reproduced data being changed. That is, such output forms a detection signal which is to be an error signal invalidating the playback audio data signal when the adjacent track within the same channel has a different correction code block during each scan.

According to this embodiment, when the adjacent track is reproduced having a different correction code block in one channel, each error flag data (AC ER FLAG), (BD ER FLAG) of the reproducing audio data (AC DATA), (BD DATA) of each channel corrected in the inner code correction circuits (12), (22) are forced into error by the detection outputs of the segment comparators (60A), (60B). The detection outputs form error flag data (EF) which are supplied to the outer code correction circuit (46). As for the uncorrected samples, the concealing circuit (49) performs a concealing operation using the surrounding samples.

In the D-2 format digital video tape recorder, 4-channel audio data ($A_0$), ($A_1$), ($A_2$), ($A_3$) are stored in the four sectors ($SC_0$), ($SC_1$), ($SC_2$), ($SC_3$). The sectors are provided two each at each end of track track ($T_N$). Recording is made so that the same contents are duplicated at each end sector of the two tracks of the same segment. In case of a shuttle reproduction, the first and second copies are not necessarily introduced at the same pair. In the present embodiment, data selecting a copy with less errors is achieved at the copy selector (80) so that the audio data having fewer errors are selected at the memory circuit (47). The selected data then are supplied to the second read address generator (55).

Figure 8:
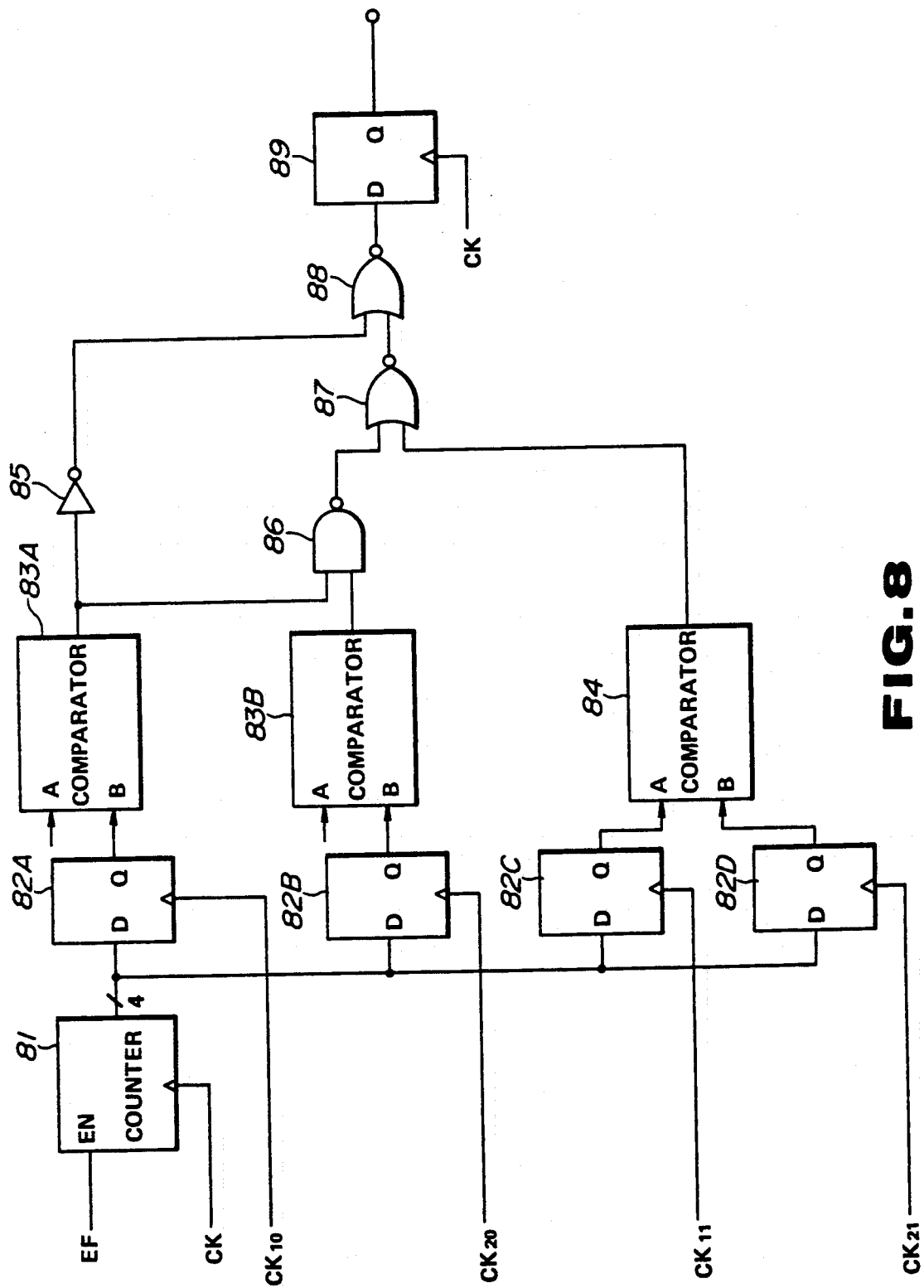
FIG. 8 is a circuit diagram showing a structural example of a copy selector also included in the illustrated embodiment.

Referring now to FIG. 8, it will be seen that the copy selector (80) may include a counter (81) which counts the clock pulses (CK) with the error flag data (EF) as the count control signals. Four D type flipflops (82A), (82B), (82C), (82D) latching the count output of the counter (81). Comparators (83A), (83B) compare the latch outputs of the D type flipflops (82A), (82B) with the predetermined value "4". A comparator (84) compares comparing the latch outputs of the D type flipflops (82C), (82D). A D type flipflop (89) receives the outputs of the comparators (83A), (83B) and (84) via various gate circuits (86), (87), (88).

The D type flipflop (82A) latches the count value of the error flag of the copy data and bit by the first clock ($CK_{10}$). The comparator (83A) outputs a logical "L" when latch output value from the D type flipflop (82A) is not more than "4".

The D type flipflop (82B) latches the count value of the error flag of the parity bit and the second copy data at the second clock ($CK_{20}$). The comparator (83B) outputs a logical "L" when the value of the latch output from the D type flipflop 82B is not more than "4".

The D type flipflop (82C) latches the count valve of the error flag of the first copy data at the third clock ($CK_{11}$). The D type flipflop (82D) latches the count value of the error flag of the second copy data at the fourth clock ($CK_{21}$). The comparator (84) compares the latch outputs of the flipflops (82C), (82D) and outputs a logical "L" when the count value of the error flag of the first copy data is less than the count value of the error flag of the second copy data.

The D type flipflop (89) at the output stage outputs a select data signal for designating the first copy data when receiving a logical "L" and for designating the second copy data when receiving a logical "H".

In the present embodiment, error correction is performed at the outer code correction circuit (46) when the count value of the error flag of the parity bit and the copy data is not more than 4. The copy data having the count value of not more than 4 is designated preferentially by the output of each comparator (82A), (82B). When both copies have the count value of not less than 4, the copy data having less error are designated at the comparator (84).

We claim:

1. Apparatus for reproducing data signals recorded on helical tracks in accordance with a format in which each track forms part of a segment and contains a plurality of sectors of data, and a plurality of segments form a field, one of said plurality of sectors having sector data that is identical with another of said plurality of sectors within the same segment, one of said plurality of segments having segment data that is identical with another of said segments within the same field, said apparatus comprising;

first detection means for detecting changes in said identical sector data during reproduction, second detection means for detecting changes in said identical segment data during reproduction, error detection means connected to said first detection means and to said second detection means for detecting that said identical segment data has changed without said identical sector data being changed and for generating an error signal, and means for forming a corrected or concealed replica of said identical sector data and said identical segment data in response to said error signal.

2. Apparatus according to claim 1, wherein each said field is divided into three segments, each of said segments is recorded on a pair of said helical tracks, each track of said pair of the helical tracks has identical audio data, and said audio data is recorded among four sectors per track.

3. Apparatus according to claim 1, wherein each of said first and second detection means includes an EX-OR circuit supplied with said identical data, said EX-OR circuit having a terminal connected to a latching means, and wherein said error detection means includes an RS flip-flop having one input terminal to which output signals of said first EX-OR circuit are supplied and another input terminal to which output signals of said second EX-OR circuit are supplied.

4. Apparatus according to claim 1, wherein said forming means comprise an outer code correction circuit and a concealing circuit, said concealing circuit being operated when said outer code correction circuit is incapable of data correction.

5. Apparatus according to claim 4, wherein said forming means comprise a concealing circuit for error concealment which includes copy selector means for selecting more reliable copy, said copy selector having a counter for counting the value of said error flag.

* * * * *